Figure 1:
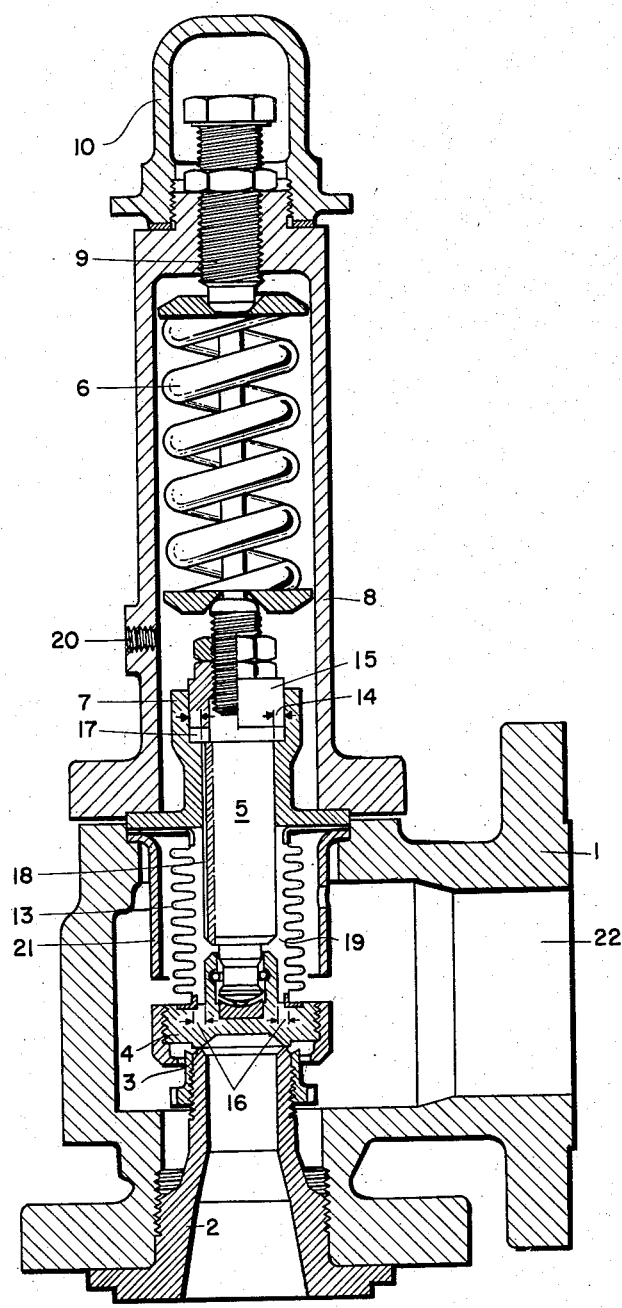

Sept. 2, 1958    J. H. L. VAN EYSBERGEN    2,850,037
BALANCED SAFETY VALVE
Filed Dec. 4, 1956

INVENTOR:
JOHAN H. L. VAN EYSBERGEN
BY:
HIS ATTORNEY

United States Patent Office 2,850,037
Patented Sept. 2, 1958

2,850,037

BALANCED SAFETY VALVE

Johan H. L. van Eysbergen, The Hague, Netherlands, assignor to Shell Development Company, New York, N. Y., a corporation of Delaware Application December 4, 1956, Serial No. 626,117

Claims priority, application Netherlands May 7, 1956

8 Claims. (Cl. 137—477)

The invention relates to a balanced safety valve in which the valve disc is spring-loaded or weighted and in which a valve stem is attached to the valve disc, which valve stem passes through the wall of the valve housing or body or through a component part of the wall, a bellows or similar element, which keeps the valve in balance, being fitted in a gas-tight manner round the valve stem between the top of the valve disc and the said wall or a component part thereof, which bellows isolates a part of the top of the valve disc, equal to the part of the bottom of the valve disc bounded by the valve seat, from the downstream side of the valve.

Owing to the appropriate choice of the diameter of the bellows, the known valves of this type have the property of being completely balanced when the interior of the bellows communicates with the atmosphere. Thus the pressure at which the valve opens is determined entirely by the degree of spring loading or weighting which holds the valve against the seat, while fluctuations in the gas pressure downstream of the valve have no effect on the opening of the valve. In other words, once the spring tension or weighting has been adjusted to a certain value, the valve is bound to open as soon as the gas pressure upstream of the valve reaches a value corresponding to that adjustment, irrespective of the gas pressure downstream of the valve.

Another property of these known valves is that the bellows prevents the gases from leaking along the valve stem and escaping to the outside air. This is particularly important if the gases are explosive or injurious to health.

A disadvantage of the valves described, however, is the risk of cracking or fracturing of the bellows. For immediately the bellows fails, the valve ceases to be balanced and the pressure of the gas downstream of the valve then affects its opening. If the gas pressure downstream of the valve has risen somewhat, for example because other safety valves connected to the same discharge line are blowing off gas, the valve will only open if the pressure upstream of the valve is higher than the value set. This means that the pressure in the vessel to which the safety valve is connected may exceed the permissible value and give rise to damage.

The disadvantages entailed by the risk of fracture or cracking of the bellows is all the more inconvenient because such fracture or cracking of the bellows usually does not occur until the valve lifts, that is to say at the very moment the pressure in the vessel tends to exceed the permissible value, i. e. just when a sound bellows is absolutely essential.

The object of the invention is to improve the said safety valve in such a way that it possesses the advantages of a valve balanced by means of a bellows, but does not suffer from the drawback that the valve ceases to be balanced in the event of cracking or fracturing of the bellows.

According to the invention this object is achieved by securing to the valve stem a piston-shaped part, the top of which can be exposed to the pressure of the atmosphere or to another virtually constant gas pressure, which piston-shaped part slidably fits in a cylindrical space, which communicates with the interior of the bellows, and by giving the resultant effective area of the piston-shaped part, situated at the side of the valve stem, such dimensions that the valve is balanced notwithstanding the bellows being fractured.

Owing to this construction, in the event of cracking or fracture of the bellows, the gas pressure prevailing downstream of the valve acts both on the resultant effective area of the piston-shaped part, situated at the side of the valve stem, and on the area of the top of the valve disc bounded by the bellows, less the area of the cross-section of the valve stem situated between the piston and the valve disc. The forces exerted on the valve disc by these pressures cancel each other exactly, so that the valve remains in balance, even after the cracking of the bellows.

If the bellows is cracked, there is, admittedly, some leakage of gas along the piston-shaped part, but this can immediately be detected by known means and steps can then be taken to replace the bellows.

It is noted that valves balanced by means of a piston-shaped part are known. These valves, however, lack the advantages of the type provided with a bellows. They are, for example, always subject to a leakage of gases along the piston to the outside air, and this is undesirable in the case of explosive or injurious gases.

The space for the piston-shaped part is preferably formed in a hollow cylindrical part in which the valve stem slidably fits, the said cylindrical part being integral with the wall of the valve housing or a component part thereof.

According to a possible embodiment, the piston comprises an annular element which is secured to or is integral with the valve stem.

The connection between the interior of the bellows and the space for the piston-shaped part can, for instance, be formed by recesses or bores in the valve stem. Alternatively, recesses or bores may be provided in the cylindrical part in which the valve stem slidably fits.

Further details of the invention and its advantages will be understood from the following description of an embodiment thereof shown in the accompanying drawing.

The drawing is a longitudinal view mainly in section showing the interior of a valve constructed according to my invention.

In the valve housing 1 there is fitted a supply pipe 2 which is provided with the valve seat 3 at the end opening into the valve housing 1. The valve disc 4, which is provided with the valve stem 5, rests on the valve seat 3. A spring 6, which acts on the valve stem 5, holds the valve disc 4 against the valve seat 3. The valve stem 5 passes through the bore in the element 7 and can move axially therein. The element 7 is fitted into a recess in the valve housing 1. The spring 6 is surrounded by a spring housing 8, which is secured to the valve housing 1, for instance by bolts (not shown). In the top of the spring housing 8 there is an adjusting element 9 by means of which the tension of the spring 6 can be adjusted. The part of the adjusting element 9 which extends beyond the spring housing 8 is covered by a removable cap 10. The bellows 13 surrounds the valve stem 5 and is secured in a gas-tight manner to the top of the valve disc 4 and to the element 7. The diameter of the bellows 13 is such that it seals off a section of the top of the valve disc 4, equal in area to the section of the bottom of the valve disc 4, which is bounded by the valve seat 3. In this way the gas pressure prevailing downstream of the valve is exerted on equal areas of the bottom and top of the valve disc. In other words, owing to the bellows 13 the valve is balanced.

To the valve stem 5 there is secured a piston-shaped part 15 adapted to move axially in a bore in the element 7. The resultant effective area 14 (indicated by arrows) of the piston-shaped part 15, situated at the side of the valve stem 5 is equal to the area 16 (indicated by arrows) of the disc 5. The space 17, i. e. the space in which the piston 15 can move, is connected by means of recesses or bores 18 in the valve stem 5 to the space 19, which is enclosed by the bellows 13. In many cases it will be advisable for the recesses or bores through which the spaces 17 and 19 communicate to be provided in the element 7 or in both the element 7 and the valve stem 5 instead of in the valve stem 5 only. By means of the opening 20 in the spring housing 8 the top of the piston 15 can be subjected to atmospheric pressure or some other virtually constant gas pressure. The hollow cylindrical part 21 serves to restrict the movement of the valve disc 4. An exhaust 22 serves for the discharge of the gas which the valve allows to pass.

The operation of the safety valve according to the invention is as follows:

The valve disc 4 is held against the seat 3 by the spring 6, the tension of which is set at a certain value by means of the adjusting element 9. As soon as the pressure of the gas in the supply pipe 2 exceeds the value determined by the spring tension, the valve disc 4 moves upwards and the gas can escape via the exhaust 22. When the pressure of the gas in the vessel on which the safety valve is fitted drops below the set value, the valve closes again. Owing to the bellows 13, the valve is completely balanced and the pressure of the gas in the exhaust 22 has no effect on the opening or closing.

If the bellows cracks, the pressure of the gas in the exhaust 22 begins to act on the upper surface of the valve disc indicated by 16 and the arrows. Owing to the channel 18, this gas pressure is transmitted to the space 17 and also acts on the resultant effective area 14 (indicated by the arrows) of the piston. However, since the areas 14 and 16 are equal, the valve remains in balance, even if the bellows is cracked. Thus the valve can always be relied on to open at the value set, and in no circumstances will its opening be affected by the pressure of the gas in the exhaust 22.

I claim as my invention:

1. A balanced safety valve comprising a valve housing having a valve seat, a spring-loaded valve disc, a valve stem attached to said valve disc, which valve stem passes through the wall of the valve housing, a bellows being fitted in gas-tight manner around the valve stem between the top of the valve disc and the said wall, the said bellows isolating a part of the top of the valve disc equal to the part of the bottom of the valve disc bounded by the valve seat from the downstream side of the valve, a piston-shaped part having its top exposed to a relatively constant pressure secured to the valve stem, said piston-shaped part being slidably fitted in a cylindrical space which communicates with the interior of said bellows, the effective area of said piston-shaped part being of such dimension that the valve remains balanced when said bellows is in a leaking condition.

2. A valve according to claim 1 in which the space for the piston-shaped part is formed by a hollow cylindrical part in which the valve stem slidably fits, said cylindrical part being integral with the wall of the valve housing.

3. A valve according to claim 1 in which the space for the piston-shaped part is formed by a hollow cylindrical part in which the valve stem slidably fits, said cylindrical part being a component part of the valve housing.

4. A valve according to claim 1 in which said piston-shaped part comprises an annular element secured to the valve stem.

5. A valve according to claim 1 in which said piston-shaped part comprises an annular element integral with the valve stem.

6. A valve according to claim 1 in which the connection between the interior of the bellows and the space for the piston-shaped part is formed by passageways in the valve stem.

7. A valve according to claim 1 in which the connection between the interior of the bellows and the space for the piston-shaped part is formed by passageways in the cylindrical part in which the valve stem slidably fits.

8. In a valve for fluid pressure systems, a valve housing, a valve seat situated in said housing, a spring-loaded valve disc, a valve stem attached to said valve disc and passing through the wall of the valve housing, a bellows fitted in gas-tight connection around said valve stem between the top of the valve disc and said wall, the said bellows isolating a part of the top of the valve disc equal to the part of the bottom of the valve disc bounded by the valve seat, an annular piston having its top exposed to the atmosphere secured to the valve stem, said piston being slidably fitted into the bore of a cylinder which communicates with the interior of said bellows by means of passageways in said valve stem, the said piston having an effective area equal to the effective area of the top of the valve disc which is additionally exposed to the downstream pressure upon a fracturing of the bellows.

No references cited.